(12) United States Patent
Yagawa et al.

(10) Patent No.: US 7,334,101 B2
(45) Date of Patent: *Feb. 19, 2008

(54) POINT IN TIME REMOTE COPY FOR MULTIPLE SITES

(75) Inventors: Yuichi Yagawa, San Jose, CA (US); Naoki Watanabe, Kanagawa-ken (JP); Shigeru Kishiro, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/510,382

(22) Filed: Aug. 24, 2006

(65) Prior Publication Data

US 2006/0288178 A1 Dec. 21, 2006

Related U.S. Application Data

(63) Continuation of application No. 10/796,454, filed on Mar. 8, 2004, now Pat. No. 7,120,769.

(51) Int. Cl.
*G06F 12/00* (2006.01)
(52) U.S. Cl. ...................................... 711/162; 707/204
(58) Field of Classification Search ................. 711/162
See application file for complete search history.

(56) References Cited

U.S. PATENT DOCUMENTS 6,499,091 B1 * 12/2002 Bergsten ..................... 711/162
7,139,887 B2 * 11/2006 Colgrove et al. ........... 711/162
2004/0260899 A1 * 12/2004 Kern et al. .................. 711/162

* cited by examiner

*Primary Examiner*—Brian R. Peugh
*Assistant Examiner*—Hashem Farrokh
(74) *Attorney, Agent, or Firm*—Townsend and Townsend and Crew LLP

(57) ABSTRACT

A method for copying data to multiple remote sites includes transmitting data from a first volume in a primary storage system to a back-up volume provided in a secondary storage system. The primary storage system is located at a primary site, and the secondary storage system is located at a first remote site from the primary site. The data from the first volume in the primary storage system is copied to a second volume in the primary storage system using a point in time (PiT) as a reference point of time for the copying. The second volume is provided with a first time consistent image of the first volume with respect to the reference point of time. The data from the second volume in the primary storage system is transferred to a third volume in a ternary storage system at a second remote site. The third volume is provided with a second time consistent image of the second volume with respect to the reference point of time, where the second time consistent image is a mirror image of the first time consistent image. The data from the third volume is transferred to a fourth volume in the ternary storage system. The fourth volume is provided with a third time consistent image. In the ternary storage, either of the third volume or fourth volume can always keep time consistent image of the first volume.

25 Claims, 7 Drawing Sheets

POINT IN TIME REMOTE COPY FOR
MULTIPLE SITES

BACKGROUND OF THE INVENTION

The present application relates to a data storage system, more particularly to a storage system for performing remote copies to multiple sites.

Industry and commerce have become so dependent on computer systems with online or interactive applications that an interruption of only a few minutes in the availability of those applications can have serious financial consequences. Outages of more than a few hours can sometimes threaten a company's or an institution's existence. In some cases, regulatory requirements can impose fines or other penalties for disruptions or delays in services that are caused by application outages.

As a consequence of this growing intolerance for application outages, there is a keen interest in improving the availability of these applications during normal operations and in decreasing the amount of time needed to recover from equipment failure or other disastrous situations.

In addition to these brief interruptions in normal operations, precautions must be taken for longer-duration outages caused by disasters such as equipment or software failure, fire, flood, earthquake, airplane crashes, terrorist or vandal activities. Realistically, these outages cannot be avoided entirely but the probability of an extended outage can be reduced to an arbitrarily small value by implementing complex systems of geographically dispersed components with redundant features that have no single point of failure.

The exposure to an extended outage can be mitigated by providing a secondary site for storing redundant or back-up data, as disclosed in U.S. Pat. No. 6,539,462, which is incorporated by reference. The data back-up can be made by performing remote data copy or local data copy (shadow copy) methods. Examples of remote copy and shadow copy are "Truecopy" and "ShadowImage" performed by some of Hitachi storage devices.

Generally a data storage center includes a primary storage site and a secondary storage site. The secondary storage site keeps a copy of production data of primary storage systems at a primary site to increase redundancy. The primary site serves as a production site and contains primary hosts and primary storage systems, and the secondly site serves as a standby and contains secondary hosts and secondary storage systems. The production data are copied from the primary storage systems to the secondly storage systems.

Recently, more and more businesses need to copy data to multiple storage systems at multiple sites to enhance redundancy and data availability. Some businesses are afraid of losing data kept in not only the primary site but also that stored in the secondary site at the same time, particularly if the business has both primary and secondary storage systems within close proximity of each other, e.g., within the same building. Accordingly, some businesses are interested in having a data storage system that has three or more storage sites for multiple data redundancies at these sites to avoid permanent loss of data as a result of a regional disaster.

In addition to their use in disaster recovery, the data redundancies may be used to provide greater data availability to users, e.g., global data sharing. Businesses or enterprises have several sites that are geographically separated that perform separate information processing operations. These enterprises, however, may wish to share data between these multiple sites. For example, master data of products information are managed and updated at the headquarter site, which are distributed to local sites for read only access, thereby providing quicker data access to users. Accordingly, global data sharing is commonly used for enterprise data warehousing.

One type of remote copy technology is a point in time (PiT) remote copy technology that enables users to have a point in time data copy of the primary site at the secondary site. That is, the data stored at the primary site is copied to the secondary site, so that the secondary site mirrors the data content of the primary site at a given instant of time.

The PiT technology is useful for providing data consistency or time consistent data among multiple storage systems at the secondary site. The requirement of keeping data consistency among multiple storage systems is common in disaster recovery for both a very large application that issue input and output requests (IOs) to several storage systems at the same time and a group of applications related to each other that requires data consistency among each of data applications. The PiT technology is also used for global data sharing, which requires data consistency among multiple storage systems, so that distributed applications may refer to the time consistent image.

However, conventional remote copy technologies are designed to provide remote copy between only two sites. Even if these technologies are extended to support three or more sites, it is difficult to keep data consistency among multiple storage systems without a new technology.

BRIEF SUMMARY OF THE INVENTION

In one embodiment, a method for copying data to multiple remote sites includes transmitting data from a first volume in a primary storage system to a back-up volume provided in a secondary storage system. The primary storage system is located at a primary site, and the secondary storage system is located at a first remote site from the primary site. The data from the first volume in the primary storage system is copied to a second volume in the primary storage system using a point in time (PiT) as a reference point of time for the copying. The second volume is provided with a first time consistent image of the first volume with respect to the reference point of time. The data from the second volume in the primary storage system is transferred to a third volume in a ternary storage system at a second remote site. The third volume is provided with a second time consistent image of the second volume with respect to the reference point of time.

The data from the third volume in the ternary storage system is copied to a fourth volume in the ternary storage system. The fourth volume is provided with a third time consistent image corresponding to the second time consistent image. The third time consistent image is substantially the same as the first time consistent image. The transmitting step involves a synchronous remote copying method, and the transferring step involves an asynchronous remote copying method. The first and second time consistent images are substantially the same.

A plurality of data write requests is received at the primary storage system from a primary host. Each of the data write requests has a timestamp and data associated with that write request. The data write requests are stored in the primary storage system. The copying step includes retrieving first timestamp associated with first data; and shadow copying the first data from the first volume to the second volume if the first timestamp indicates a time that is prior to the reference point of time. The method also includes retrieving second timestamp associated with the second data; and not copying the second data to the second volume if the second timestamp indicates a time that is subsequent to the reference point of time. The method also includes suspending the copying step if all data stored in the first volume having timestamps that precede the reference point of time are shadow copied to the second volume.

The method also includes copying the data from the third volume in the ternary storage system to a fourth volume in the ternary storage system, the fourth volume being provided with a third time consistent image corresponding to the second time consistent image; and estimating time required for providing the fourth volume with the third time consistent image using information relating to the an amount of data copied from the first volume to the second volume in a previous copy cycle. The amount of data corresponds to the data copied to the second volume from the first volume to provide the second volume with the second time consistent image. The information relating to the amount of data copied from the first volume to the second volume corresponds to a copy time needed to provide the second volume with the second time consistent image.

In another embodiment, a method for copying data to a remote site includes copying data from a first volume to a second volume to provide the second volume with a first time consistent image with respect to a first given time. The first and second volumes are provided in a first storage system. The data from second volume is transferred to a third volume to provide the third volume with a second time consistent image with respect to a second given time. The third volume is provided in a second storage system that is located at least 10 miles from the first storage system. The data stored in the first volume is transmitted to a back-up volume provided in a third storage system. The transmitting step involves a synchronous remote copying method and the transferring step involves an asynchronous remote copying method.

The method also includes receiving the data at the first storage system from a third storage system. The receiving step involves a synchronous remote copying method and the transferring step involves an asynchronous remote copying method. The first and second storage systems are storage sub-systems. The first given time and the second given time are the same. The copying step includes copying the data from the first volume to a plurality of secondary volumes to provide each of the secondary volumes with the first time consistent image with respect to the first given time. The first and secondary volumes are provided in the first storage system. The transferring step includes transferring the data from the secondary volume to a plurality of ternary volumes to provide each of the ternary volumes with the second time consistent image with respect to the second given time. The ternary volumes are provided in a plurality of secondary storage systems that are located at least 10 miles from the first storage system.

In another embodiment, a computer system includes a timer to provide a timestamp to data requests; an interface configured to form a communication link with a first storage sub-system; and a computer storage medium. The medium includes code for initiating copying of data from a first volume to a second volume to provide the second volume with a first time consistent image with respect to a first given time, the first and second volumes being provided in a first storage sub-system, and code for initiating transferring of the data from second volume to a third volume to provide the third volume with a second time consistent image with respect to a second given time, the third volume being provided in a second storage system that is located at least 10 miles from the first storage sub-system. The computer system is a host coupled to the first storage sub-system or a storage system including a plurality of storage sub-systems provided at multiple sites.

In yet another embodiment, a computer readable medium for use in a storage system includes code for copying data from a first volume to a second volume to provide the second volume with a first time consistent image with respect to a first given time, the first and second volumes being provided in a first storage system; and code for transferring the data from second volume to a third volume to provide the third volume with a second time consistent image with respect to a second given time, the third volume being provided in a second storage system that is located at least 10 miles from the first storage system. The medium is provided in a host or storage sub-system.

DETAILED DESCRIPTION OF THE INVENTION

Embodiments of the present invention are directed to providing remote copying to three or more sites. A storage system according to an embodiment of the present invention provides more reliable disaster recovery solution since data may be copied to three of more sites. Such a storage system also enables an effective global data sharing solution since it enables data to be shared or distributed to multiple geographical sites.

Figure 1:
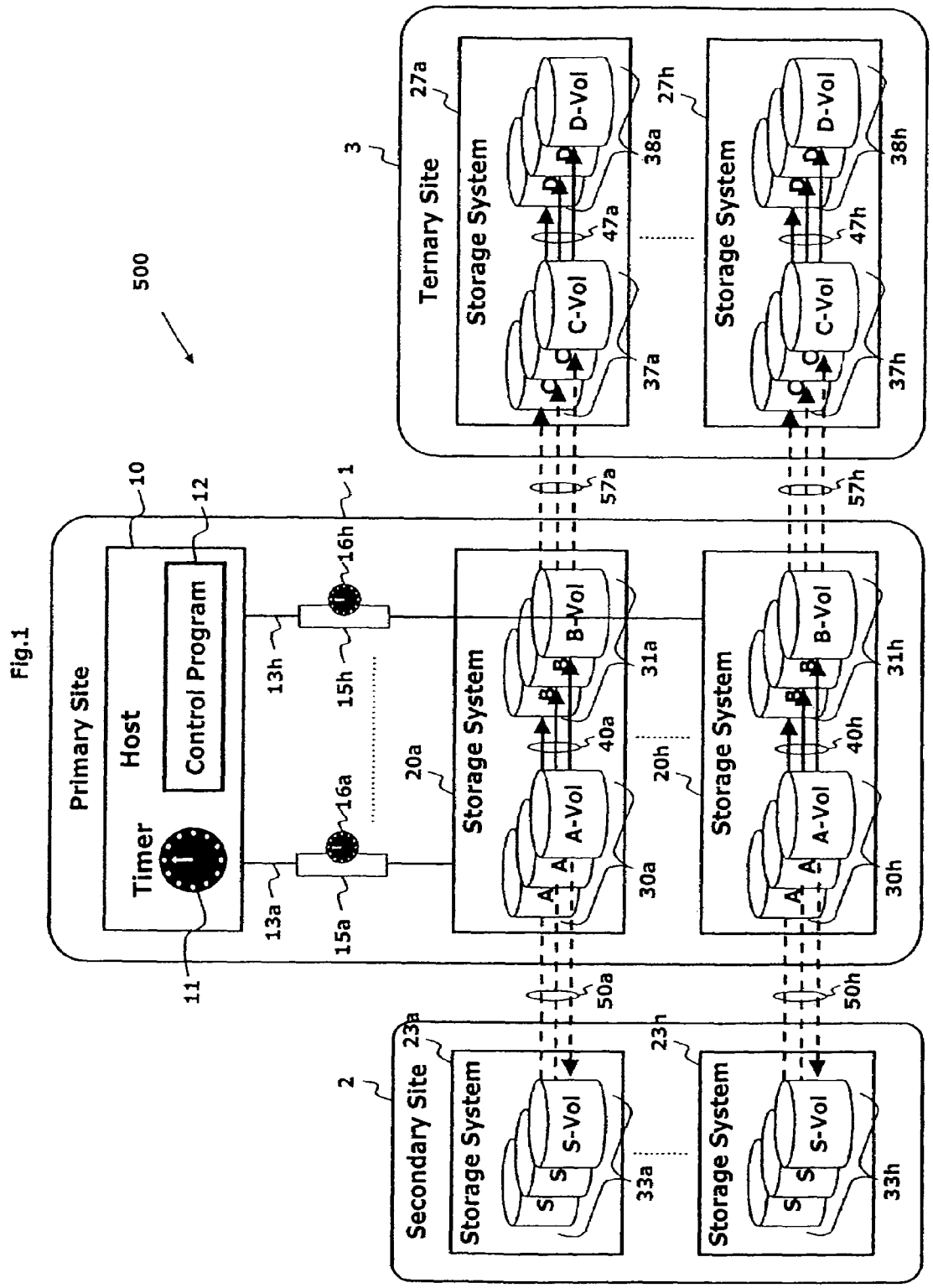
FIG. 1 shows an information processing system including a primary site, a secondary site, and a ternary site and configured for remote copying to multiple sites according to one embodiment of the present invention.

FIG. 1 shows an information processing system (or a storage system) 500 including a primary site 1, a secondary site 2, and a ternary site 3. Each site includes one or more hosts 10 (not shown for secondary and ternary sites). Each site also includes one or more storage systems 20*a-h*, 23*a-h*, and 27*a-h*. These storage systems may also be referred to as storage sub-systems and include disk array units. The hosts and storage systems are connected to each other for IOs 15*a-h* via one or more communication links 13*a-h*. Examples of the communication links include ESCON, FICON and FibreChannel. The host 10 of the primary site 1 includes a timer 11 to provide time-stamps 16*a-h* to the IOs 15a-h directed to the storage systems 20a-h. Each timer in the hosts is synchronized with the others to provide the same time for respective IOs.

The primary site 1 and the secondary site 2 is coupled to each other via a wide area network according to one embodiment of the present invention. The primary site 1 and the ternary site 3 are coupled to each other via a wide area network. Examples of the wide area network are DWDM, ATM, SONET, and Internet. Data paths or links 50a-h are logical remote copy paths between the storage system in the primary site and the storage system in the secondary site. Data paths or links 57a-h are logical remote copy lines between the storage system in the primary site and the storage system in the ternary site.

In the primary site 1, the storage systems 20a-h contain two types of volumes, A-Vols 30a-h and B-Vols 31a-h. The B-Vols 31a-h are the shadow copy targets of A-Vols 30a-h. The data paths 40a-h indicate logical links of shadow copy between A-Vols 30a-h and B-Vols 31a-h in the same storage systems 20a-h.

In the secondary site 2, the storage systems 23a-h contain volumes S-Vols 33a-h, which are the synchronous remote copy targets of A-Vols 31a-h. Data paths 50a-h indicate logical links of remote copy between A-Vols 30a-h and S-Vols 33a-h.

In the ternary site 3, the storage systems 27a-h includes two types of volumes, C-Vols 37a-h and D-Vols 38a-h. The C-Vols 37a-h are the asynchronous remote copy targets of B-Vols 31a-h, and the D-Vols 38a-h are the shadow copy targets of C-Vols 37a-h. Data paths 57a-h indicate logical links of remote copy between B-Vols 31a-h and C-Vols 37a-h. Data paths 47a-h indicate logical links of shadow copy between C-Vols 37a-h and D-Vols 38a-h in the same storage systems 27a-h.

In operation, the primary site 1 serves as a production site that generates production data in its storage systems. The secondary site 2 serves as a "hot or warm" standby site, which takes over the operation from the primary site and continues the production automatically or semi-automatically in case of planned shutdowns or unplanned outages. The planned shutdowns include system upgrades and maintenances. The unplanned outages include system failures resulting from device failures or natural disaster.

For such situations, the secondary site 2 keeps synchronous remote copy data in its storage systems. Generally, synchronous techniques involve receiving write commands from a host and confirming the successful recording of new information on the primary and secondary storage systems before acknowledging to the host that the write command has been completed.

Accordingly, the primary and secondary sites are generally located relatively close to each other, e.g., within the same city, metropolitan region, campus, or building, to prevent data transmission delays resulting from the synchronous remote copy procedure. In one embodiment, the primary site and the secondary site are provided within about 10 miles of each other. In another embodiment, the two sites are provided within about 100 miles of each other.

The ternary site 3 operates as a "cold" standby site, which takes over the operation from the primary site 1 and continues the production in case of planned shutdowns or unplanned outages. The ternary site may also serve as a new primary site if a region disaster occurs and takes both the primary and secondary sites 1 and 2 off the system. The ternary site 3 receives data from the primary site via asynchronous remote copy methods according to one embodiment of the present invention. Accordingly, the ternary site 3 may be located at any distance from the primary site, either far or close. In one embodiment, the ternary site is located more than 10 miles from the primary site. In another embodiment, the ternary site is located more than 100 miles from the primary site.

The remote copy and shadow copy operations are controlled by a control program 12 provided in the host 10 according to one embodiment of the present invention.

The information processing system 500 provides enhanced data availability and disaster recovery. For example, if a minor disaster causes the primary site 1 to fail, the operation will fail over to the secondary site 2. If a major disaster brings down both the primary site 1 and the secondary site 2, operations of these sites can fail over to the ternary site 3. The possibility of losing all three sites at the same time is very remote.

In one embodiment, the primary storage systems 20a-20h use a synchronous remote copy method and a combination of shadow copy and asynchronous remote copy. One volume may be provided with a remote copy link and a shadow copy link at the same time because each operation essentially has the different logics and does not require complicated state transition mechanisms. In addition, the volume that is the target of the shadow copy link may be provided with a remote copy link to a volume in the remote storage system.

The above approach solves the problem of providing the primary storage systems 20a-h with both synchronous remote copy links 50a-h to the secondary storage systems 23a-h and asynchronous remote copy links 57a-h to the ternary storage systems 27a-h at the same time, thereby avoiding the difficulty and high cost of providing a volume with complex state transition mechanisms for multiple remote copy links at the same.

Another issue associated with the information processing system 500 having three or more data centers is the need to maintain data consistency or time consistent data at these sites. In one embodiment, such a condition is needed since the IOs or data requests from one host or several hosts are provided to all these storage sites. The ternary storage systems 27a-h receive asynchronous remote copy from the primary storage systems 20a-h. Generally, asynchronous remote copy does not assure data consistency between multiple storage systems without quiescing the application.

One method of resolving the above problem involves the use of PiT shadow copy method, as explained below. The PiT copying provides a copy of information that is consistent at some prescribed point in time. The PiT shadow copy provides a shadow copy of data stored in A-Vol 30 at a specific point in time to B-Vol 31.

Figure 2:
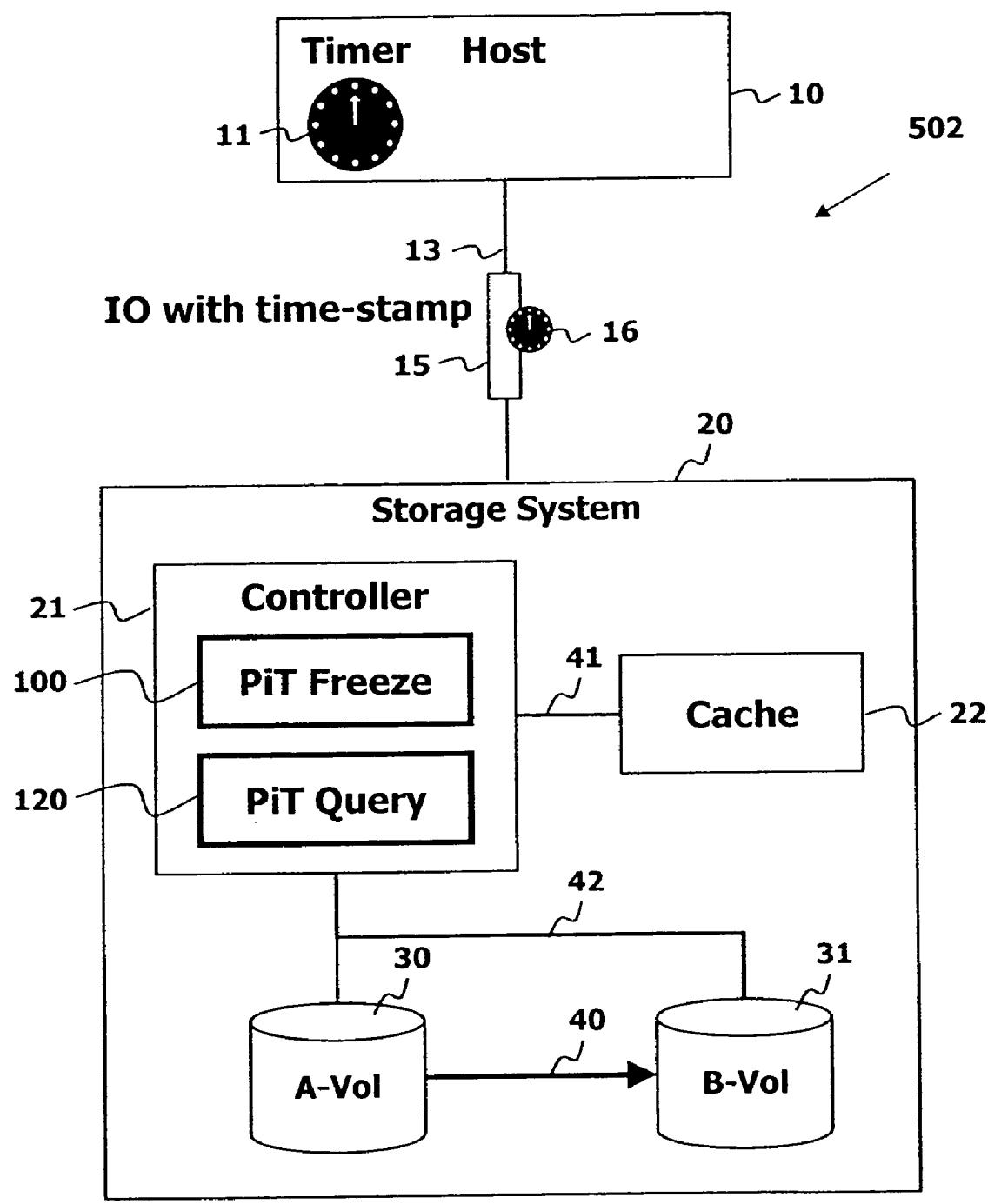
FIG. 2 illustrates a block diagram of a system that is configured to provide the PiT shadow copy according to one embodiment of the present invention.

FIG. 2 illustrates a block diagram of a system 502 that is configured to provide the PiT shadow copy according to one embodiment of the present invention. The system 502 corresponds to the primary site 1 of FIG. 1.

The storage system 20, e.g., disk array unit, includes one or more controllers 21 to process the data requests (IOs) from the host 10 as well as other administrative operations of the storage system 20, e.g., remote copy, shadow copy, and so on. One or more cache 22 is provided to temporarily store data that are frequently accessed as well as control data for shadow and remote copies.

A communication link 41 couples the controller 21 to the cache 22. A communication link 42 couples the controller 21 to volumes 30 and 31. Examples of the communication links are PCI, FibreChannel, and the like. A data path 40 indicates a logical link of shadow copy from A-Vol 30 to B-Vol 31.

The controller includes a PiT Freeze 100 to facilitate the PiT copy process. When a user or the system executes this function and inputs a given time, the controller 21 prevent write requests (or IOs) with the time-stamp after that the given time from being copied in shadow copy from A-Vol 30 to B-Vol 31, as explained below in connection with FIG. 3. A volume pair, consistency group, or other volume pair group is formed as a result of the following operation.

Figure 3:
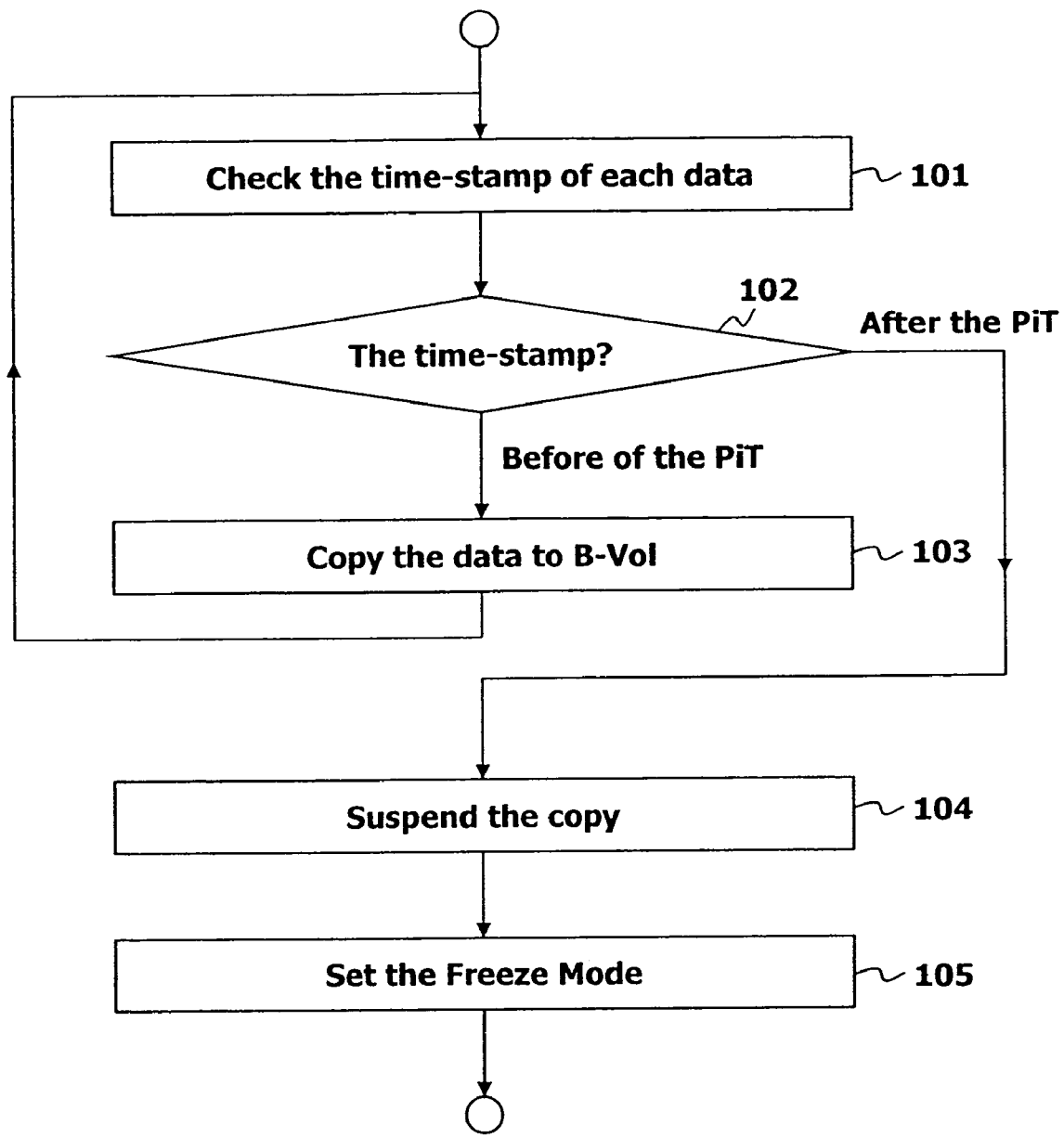
FIG. 3 illustrates a process for performing a PiT shadow copy from the A-Vol to the B-Vol to form a volume pair according to one embodiment of the present invention

FIG. 3 illustrates a process for performing a PiT Freeze command according to one embodiment of the present invention. At step 101, the timestamp of each data being replicated from A-Vol 30 to B-Vol 31 is checked. The timestamp 16 is added to the IOs 15 to be written to the storage system by the timer 11 of the host (see FIGS. 1 and 2). If there are a plurality of hosts in the primary site, each host is provided with a timer that is synchronized with each other. It is determined whether or not the timestamp associated with the data being examined indicates a time that is before or after the specified time (or PiT). If the timestamp is before the PiT, the data associated with the timestamp is copied to the B-Vol (step 103). Thereafter, next data is retrieved to continue the copy process.

In another embodiment, all IOs to storage systems are frozen, and than dummy IOs (or Mark IOs) are issued to keep time consistency among the storage systems. The process detects the dummy IOs instead of the particular timestamps when it operates PiT Freeze.

If the timestamp is after the PiT, the shadow copy process is suspended (step 104). As a result, the B-Vol mirrors the data content of the A-Vol as of the specified PiT. The contents of the B-Vol is then copied to the storage system in the ternary site 3, as explained below. The controller 21 sets the mode of each volume as the Freeze Mode to indicate B-Vol 31 contains the specific point in time shadow copy of A-Vol 30 (step 105).

In one embodiment, each of the IOs from the host 10 is also provided with a sequence number to indicate its order relative to other IOs. The shadow copy process of FIG. 3 checks the sequence numbers of the IOs to ensure that the Freeze mode is set after all IOs having timestamps before the PiT have been copied to the B-Vol. The use of sequence number ensures the integrity of the PiT shadow copy process to the target volume (B-Vol) even if some IOs are written to the storage system out sequence as a result of a bottle neck at a given point in the network connection. In one implementation, both the sequence number and the timestamps are checked for the copy process. In another implementation, the sequence number is used instead of the timestamp.

Referring back to FIG. 2, the controller 21 also includes a PiT Query 120 operable to check the mode of each volume or volume group and return the result. The modes include a Freeze Mode or non-Freeze Mode. In one embodiment, the volume group is a Consistency Group. The Consistency Group includes a plurality of volume pairs that keep IO consistency within the group. The Query 120 informs the control program 12 in the host 10 as to the status of the shadow copy link between A-Vol 30*a-h* and B-Vol 31 *a-h*. Issuing a PiT Query command for a Consistency Group is more efficient than issuing commands for all volume pairs in the system.

Figure 4:
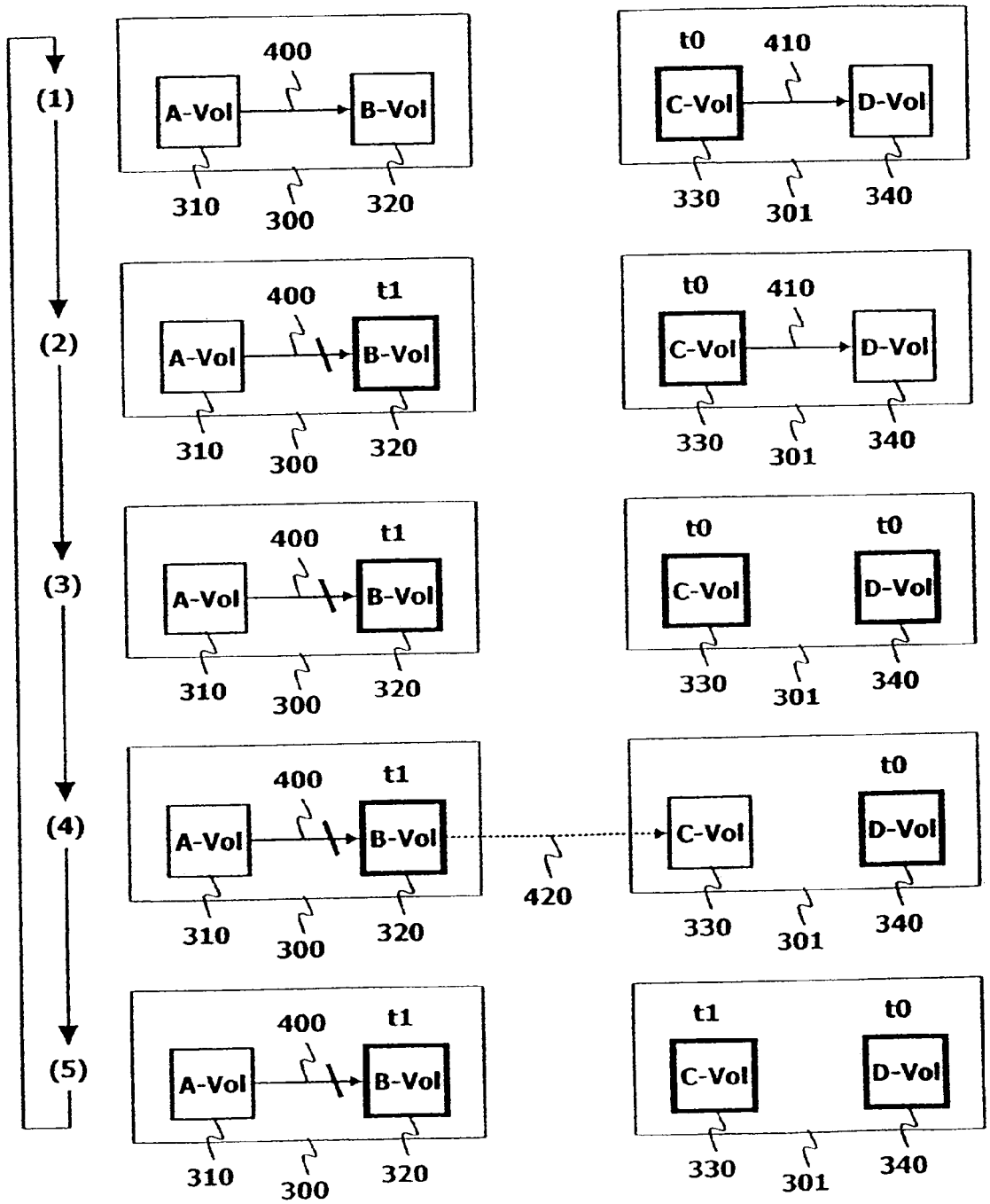
FIG. 4 illustrates a state transition of a PiT remote copy process associated with a PiT shadow copy process according to one embodiment of the present invention.

FIG. 4 illustrates a state transition of a PiT remote copy process associated with a PiT shadow copy process according to one embodiment of the present invention. The storage systems 300 and 301 correspond to the storage systems 20*a-h* and 27*a-h* in FIG. 1, respectively. That is, the storage system 300 represents a primary storage system, and the storage system 301 represents a ternary storage system. In addition, A-Vol 310, B-Vol 320, C-Vol 330, and D-Vol 340 correspond to A-Vol 30*a-h*, B-Vol 31*a-h*, C-Vol 37*a-h*, and D-Vol 38*a-h*, respectively. Shadow copy links 400 and 410 and a remote copy link 420 correspond to the shadow copy links 40*a-h* and 47*a-h* and the remote copy link 57*a-h*, respectively.

Figure 5:
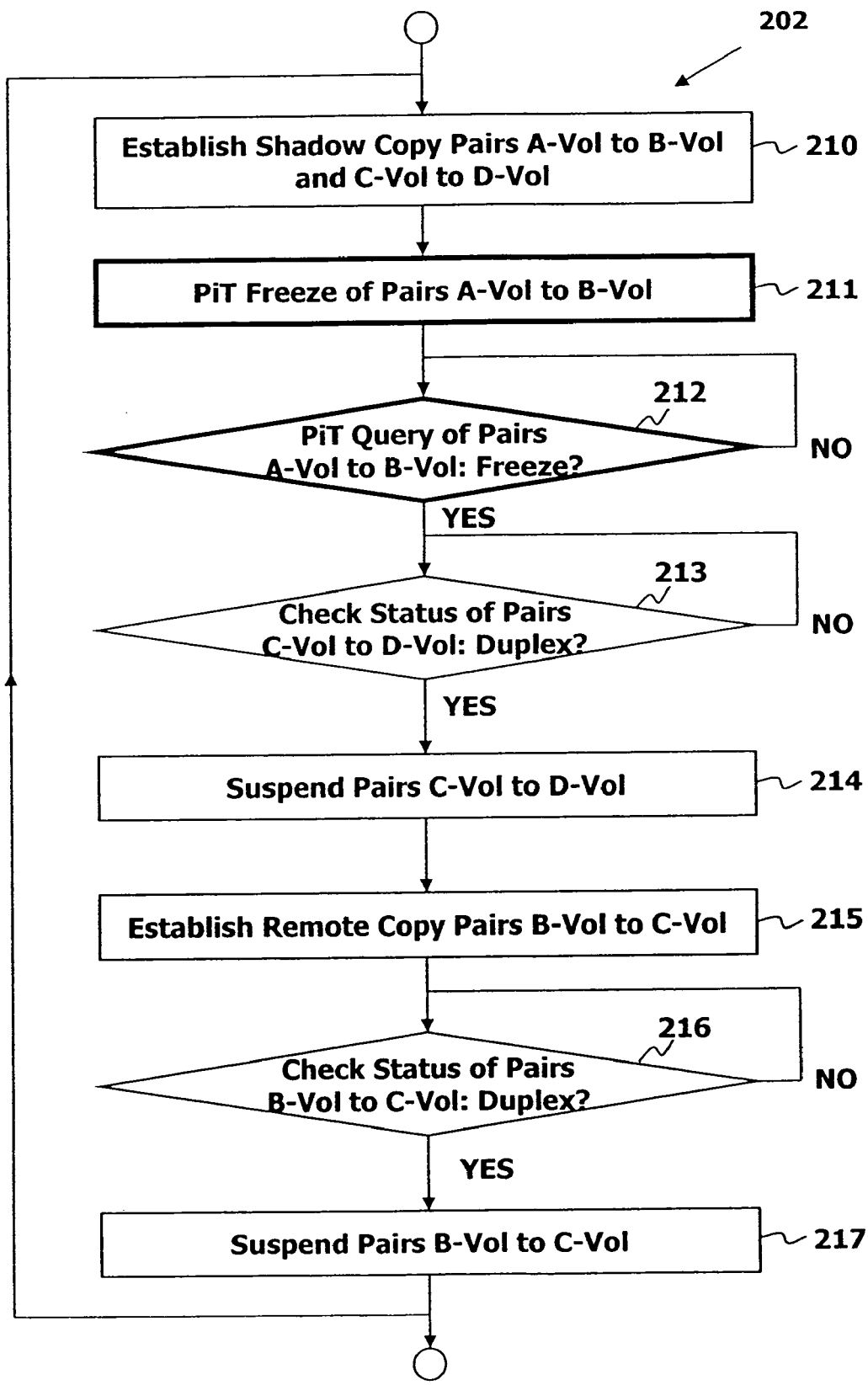
FIG. 5 shows a process performed by the control program during the PiT remote copy and PiT shadow copy processes according to one embodiment of the present invention.

FIG. 5 shows a process 202 performed by the control program 12 during the PiT remote copy and PiT shadow copy processes according to one embodiment of the present invention. The process 202 is explained with reference to FIGS. 4 and 5. At step 210, the control program attempts to establish a first shadow copy pair at the primary storage system 300 between the A-Vol 310 and B-Vol 320 as indicated by the link 400 and a second shadow copy pair at the ternary storage system 301 between the C-Vol 330 and the D-Vol 340 as indicated by the link 410. The above step is reflected in the state (1) of FIG. 4. At the state (1), the C-Vols 330 has a time consistent image at t0 of the ternary storage 301. The D-Vol 340 does not yet have a time consistent image since the shadow copy is underway. The A-Vol receives updates from the host, and the updates are copied to B-Vol, so the B-Vols are not yet time consistent across a consistency group.

In one implementation, the control program of a host in each of the site handles the shadow copy process at its own site. In this case, the control programs communicate with each other through communication links such as Local Area Network. In another implementation, a single control program, e.g., the one associated with the primary site, controls the shadow copies in both the primary and ternary sites. In this case, the control program sends commands to the ternary sites through remote copy links.

At step 211, the control program executes a PiT freeze function to the shadow copy pairs 400 of A-Vols 310 to B-Vols 320. The state (2) of FIG. 4 indicates the PiT freeze by placing a bar on the link 400.

At step 212, the control program executes a PiT query function to the pair 400 of A-Vol 310 to B-Vol 320 in the consistency group and checks its status. In one embodiment, a consistency group includes a plurality of pairs of A-Vols 310 and B-VOL 320. The consistency group indicates a group in which all volumes should be kept in consistency. This step continues until all the pairs in the group indicate as having been placed in the Freeze Mode. This indicates that the B-Vols 320 have time consistent image at t1. The C-Vols 330 continues to have the time consistent image at t0.

At step 213, the program checks the shadow copy status of the shadow copy pairs 410 in the consistency group in the ternary storage system 310. This step is repeated until all the pairs in the group indicate as being placed on the Duplex Mode, whereby the D-Vols 340 are identical to the C-Vols 330. In one implementation, there is no update on C-Vols during this step.

At step 214, if all pairs are in the Duplex Mode, the program terminates the shadow copy process in the ternary storage system and suspends all pairs of C-Vols 330 to D-Vols 340. As a result, the D-Vols 340 and the C-Vols 330 are provided with time consistent image with respect to time t0. The state (3) of FIG. 4 illustrates this situation.

At step 215, once the pairs of C-Vols 330 to D-Vols 340 have been suspended, the control program establishes remote copy links 420 between B-Vols 320 and C-Vols 330, thereby forming a plurality of pairs of B-Vols and C-Vols. The remote copy links 420 correspond to the links 57*a-h* shown in FIG. 1. The D-Vols 340 have time consistent image at t0 in the ternary storage 301. The C-Vols 340 serve as targets for the remote copy from the B-Vols. Accordingly the C-Vols no longer have the time consistent image. Therefore, the earlier shadow copy to the D-Vol 340 ensures that the time consistent image at the ternary storage site is maintained. The state (4) of FIG. 4 illustrates the situation above.

At step 216, the control program checks the remote copy status of all pairs 420 of B-Vols 320 and C-Vols 330 in the consistency group. This step continues until all the pairs in the group are placed in the Duplex Mode that indicates C-Vols 330 are identical to B-Vols 320. In one implementation, there is no update on B-Vols during this step.

If all pairs are in the Duplex Mode, the program terminates the remote copy process and suspends all pairs of B-Vols 320 and C-Vols 330 (step 217). As a result, C-Vols 330 have the time consistent image corresponding to the data content of B-Vols 320 with respect to the time t1. This is indicated by the state (5). From the state (5), the program returns to the state (1) and repeats the steps above. The time that it takes to start at the state (1) and return back to the state (1) is referred to as a cycle time. The states (1) to (5) define a copy cycle (or first copy cycle). Accordingly, subsequent states (1) to (5) define next copy cycle (or second copy cycle). The first copy cycle is a previous copy cycle of the second cycle.

The cycle time also indicates an approximate time to needed to make a PiT copy of the production data in the ternary storage 301, which is t1−t0. The cycle time should be reduced to a minimum to keep a fresh copy of the production data in the ternary site 3.

In order to reduce the cycle time, the state (2) including step 211 and 212, and the state (3) including step 213 and 214 may be processed in parallel since there is no relation between these two states and processes. Under this embodiment, the program checks if both of the states (2) and (3) are completed and prior to proceeding to the state (4).

Also, in order to eliminate unnecessary overheads, the process time required for the state (2) and the process time required for the state (3) preferably should be substantially the same. For this purpose, the control program should efficiently determine point in times with PiT Freeze function as estimating the time required for the shadow copy from C-Vols 330 to D-Vols 340.

One example of the method is provided as follows. At the state (2) of every cycle, the program calculates the amount of data to be shadow copied from A-Vols 310 to B-Vols 320. This amount of data would be shadow copied from C-Vols 330 to D-Vols 340 in the next cycle.

Before the state (2) of the next cycle, the program estimates the time required for the shadow copy from C-Vols 330 to D-Vols 340 considering the amount of data copied from A-Vols 310 to B-Vols 320 in the previous cycle. Then, the program defines the point in time with PiT Freeze function based on the estimated time.

Figure 6:
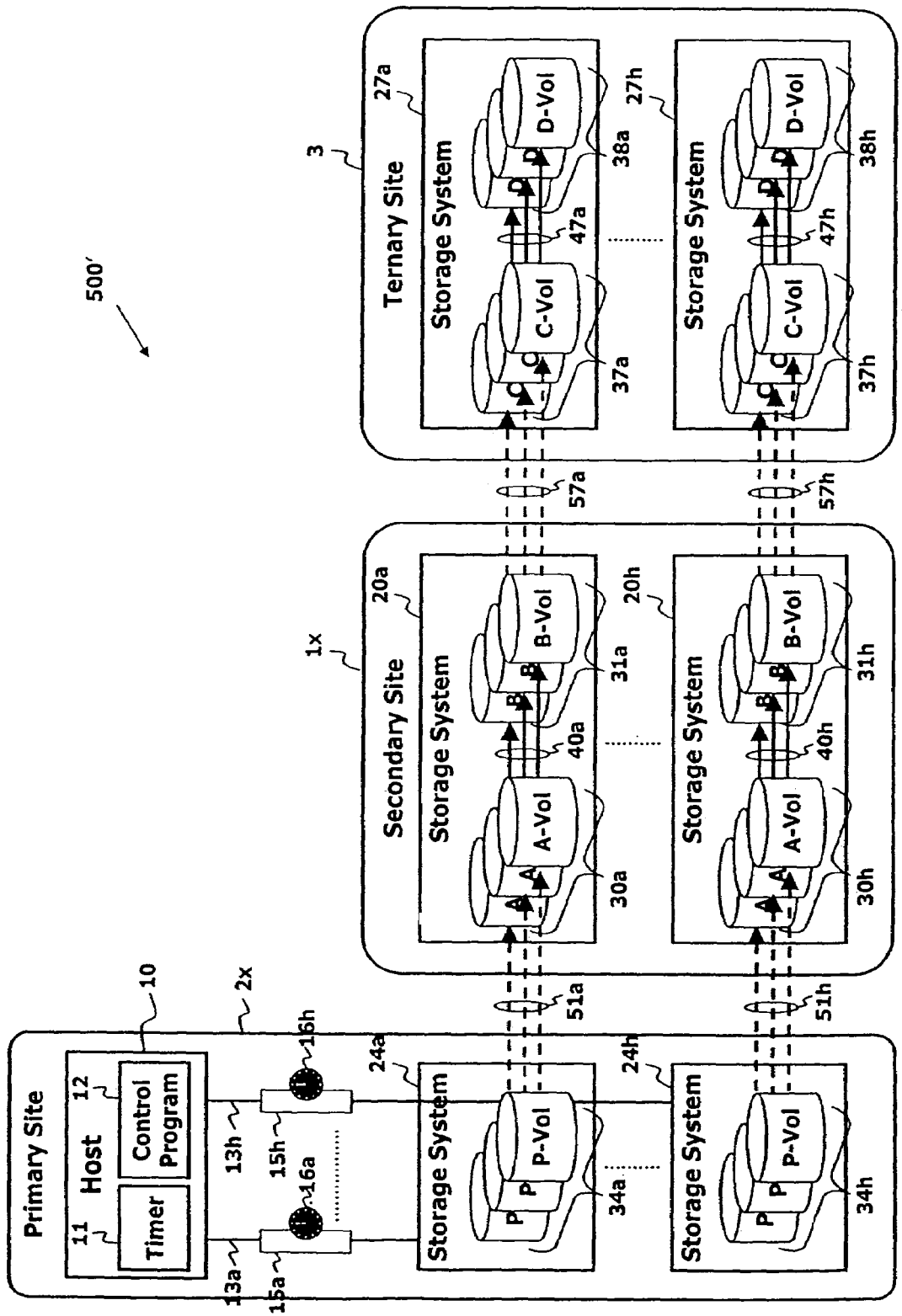
FIG. 6 illustrates an information processing system configured for remote copying to multiple sites according to another embodiment of the present invention.

FIG. 6 illustrates an information processing system 500' according to another embodiment of the present invention. In the system 500', the primary storage system resides in the site 2x. That is, the production system copies data to the secondary site 1x that in turn copies data to the ternary site 3. Accordingly, the direction of the remote copy links 51a-h between the primary site 2x and the secondary site 1x is different from the first embodiment. The shadow copy processes in the storage systems 20a-h and 27a-h are substantially the same as described above. The remote copy between the storage system 20a-h and the storage system 27a-h is also substantially the same as before.

However, the role of the storage systems 24a-h in the primary site 2x is different from the previous embodiment since the system 24a-h serves as a production system rather than a back-up system. Also, the A-Vols 30a-h are now the targets of the synchronous remote copy links 51a-h from the P-Vols 34a-h. In this case, the synchronous remote copy links 51a-h must pass timestamps 16a-h with IOs. In another embodiment, the synchronous remote copy links 51a-h must pass dummy IOs. The dummy IOs are issued to keep time consistency among the storage systems when all IOs to storage systems are frozen. The process detects the dummy IOs instead of the particular timestamps when it operates PiT Freeze.

Figure 7:
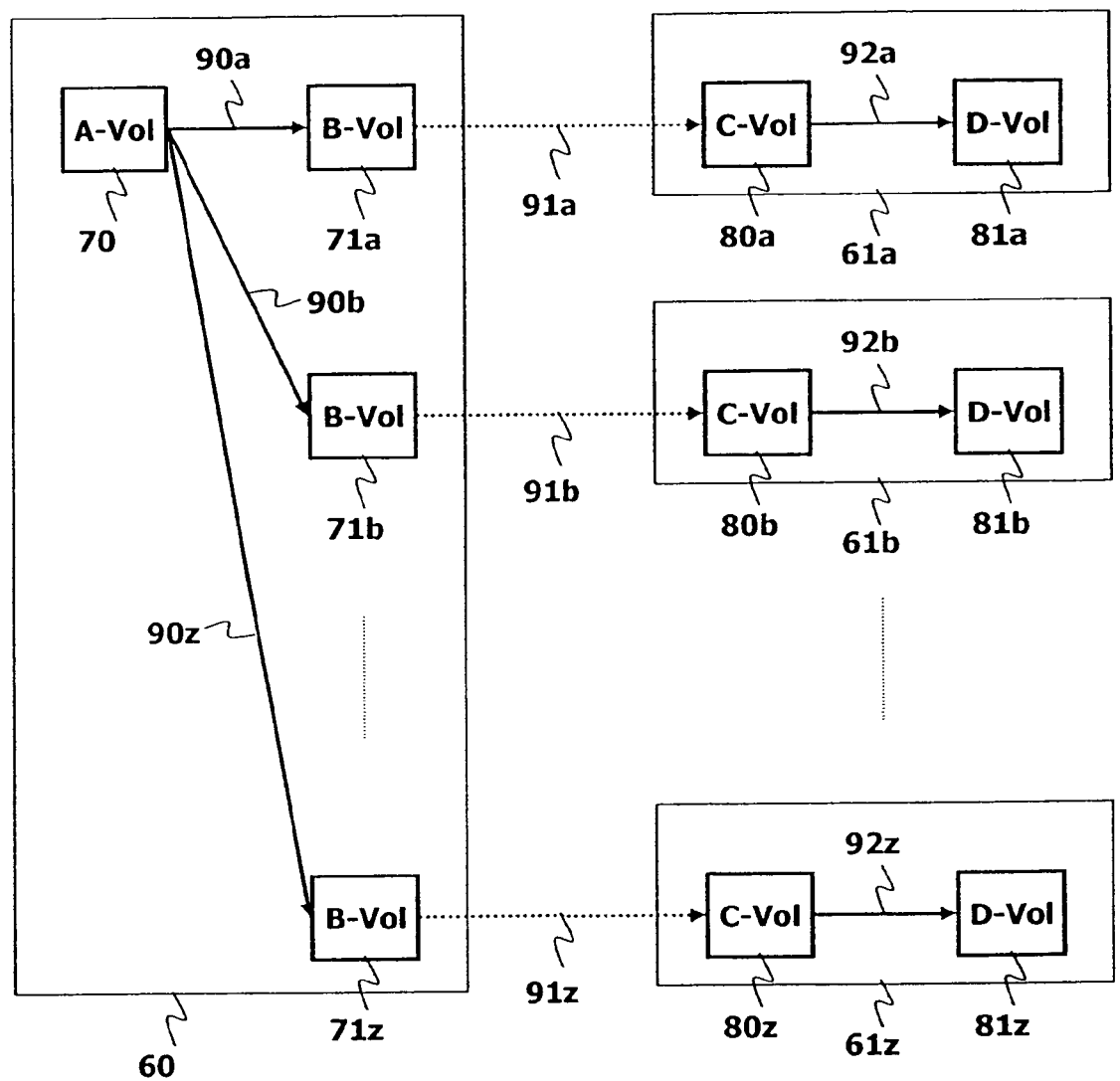
FIG. 7 shows a block diagram an information processing system configured for remote copying to multiple sites according to one embodiment of the present invention.

FIG. 7 shows a block diagram an information processing system 504 according to one embodiment of the present invention. The system 504 includes a primary storage system 60 and a plurality of distributed storage systems 61a-z. The primary storage system 60 has at least one A-Vol 70 and a plurality of B-Vols 71a-z. The B-Vols are targets of shadow copy links 90a-z from A-Vol 70. The distributed storage systems 61a-z have a plurality of C-Vols 80a-z that are the targets of remote copy links 91a-z from B-Vols71a-z. The distributed storage systems also includes a plurality of D-Vols 81a-z that are the targets of shadow copy links 92a-z from C-Vols 80a-z.

The primary storage system 60 maintains production data. The distributed storage systems 61a-z maintains back-up data for use in a disaster recovery and to share data among multiple sites distributed geographically. To provide global data sharing, each distributed storage system 61a-z includes time consistent data that is a point in time copy of the production data. Accordingly, a PiT shadow copy is performed between the A-Vol and the B-Vols in the system 60. Meanwhile, copies are performed between the C-Vols and D-Vols in the distributed systems 61. Once the PiT shadow copy has been completed, a multiple remote copies are performed between the B-Vols to the C-Vols, to provide C-Vols with the IO consistent image of A-Vol.

The present invention has been described in terms of specific embodiments. As will be understood by those skilled in the art, the embodiments disclosed above may be modified, changed, or altered without departing from the scope of the present invention. Accordingly, the scope of the present invention is to be interpreted based on the appended claims.

What is claimed is:

1. A computer system, comprising:
    a primary storage system located at a primary site;
    a secondary storage system located at a first remote site from the primary site; and
    a ternary storage system located at a second remote site from the primary site;
    wherein the primary storage system is configured to transmit data from a first volume in a primary storage system to a back-up volume provided in the secondary storage system;
    wherein the primary storage system is configured to copy the data from the first volume in the primary storage system to a second volume in the primary storage system using a point in time (PiT) as a reference point of time for the copying, the second volume being provided with a first time consistent image of the first volume with respect to the reference point of time;
    wherein the primary storage system is configured to transfer the data from the second volume in the primary storage system to a third volume in the ternary storage system, the third volume being provided with a second time consistent image of the second volume, which is substantially the same as the first time consistent image; and
    wherein the ternary storage system is configured to copy the data from the third volume in the ternary storage system to a fourth volume in the ternary storage system, the fourth volume being provided with a third time consistent image corresponding to the second time consistent image, the third time consistent image being substantially the same as the first time consistent image.

2. The computer system of claim 1, wherein the primary storage system is configured to transmit data from the first volume in the primary storage system to the backup volume provided in the secondary storage system using a synchronous remote copying method, and to transfer the data from the second volume in the primary storage system to the third volume in the ternary storage system using an asynchronous remote copying method.

3. The computer system of claim 1, wherein the first and second time consistent images are substantially the same.

4. The computer system of claim 1, wherein the primary storage system is configured to receive a plurality of data write requests from a primary host, each of the data write requests having a timestamp and data associated with that write request, and to store the data write requests in the primary storage system.

5. A computer system comprising:
a primary storage system located at a primary site;
a secondary storage system located at a first remote site from the primary site; and
a ternary storage system located at a second remote site from the primary site;
wherein the primary storage system is configured to transmit data from a first volume in the primary storage system to a back-up volume provided in the secondary storage system;
wherein the primary storage system is configured to copy the data from the first volume in the primary storage system to a second volume in the primary storage system using a point in time (PiT) as a reference point of time for the copying, the second volume being provided with a first time consistent image of the first volume with respect to the reference point of time;
wherein the primary storage system is configured to transfer the data from the second volume in the primary storage system to a third volume in the ternary storage system, the third volume being provided with a second time consistent image of the second volume, which is substantially the same as the first time consistent image;
wherein the primary storage system is configured to receive a plurality of data write requests from a primary host, each of the data write requests having a timestamp and data associated with that write request, and store the data write requests in the primary storage system; and
wherein copying the data from the first volume in the primary storage system to the second volume in the primary storage system includes retrieving a first timestamp associated with first data of the data; and shadow copying the first data from the first volume to the second volume if the first timestamp indicates a time that is prior to the reference point of time.

6. The computer system of claim 5, wherein the primary storage system is configured to retrieve a second timestamp associated with second data of the data; and not copy the second data to the second volume if the second timestamp indicates a time that is subsequent to the reference point of time.

7. The computer system of claim 5, wherein the primary storage system is configured to suspend copying the data from the first volume to the second volume if all data stored in the first volume having timestamps that precede the reference point of time are shadow copied to the second volume.

8. The computer system of claim 7, wherein the primary storage system is configured to determine whether or not the first and second volumes are placed in a freeze mode; and check the status of the second and third volumes to determine if the second time consistent image of the second volume has been copied entirely to the third volume.

9. The computer system of claim 8, wherein the primary storage system is configured to suspend transferring data from the second volume in the primary storage system to the third volume in the ternary storage system upon determining that the third volume has been provided with a time consistent image corresponding to the second time consistent image.

10. A computer system comprising:
a primary storage system located at a primary site;
a secondary storage system located at a first remote site from the primary site; and
a ternary storage system located at a second remote site from the primary site;
wherein the primary storage system is configured to transmit data from a first volume in the primary storage system to a back-up volume provided in the secondary storage system;
wherein the primary storage system is configured to copy the data from the first volume in the primary storage system to a second volume in the primary storage system using a point in time (PiT) as a reference point of time for the copying, the second volume being provided with a first time consistent image of the first volume with respect to the reference point of time;
wherein the primary storage system is configured to transfer the data from the second volume in the primary storage system to a third volume in the ternary storage system, the third volume being provided with a second time consistent image of the second volume, which is substantially the same as the first time consistent image;
wherein the ternary storage system is configured to copy the data from the third volume in the ternary storage system to a fourth volume in the ternary storage system, the fourth volume being provided with a third time consistent image corresponding to the second time consistent image; and
wherein the ternary storage system is configured to estimate time required for providing the fourth volume with the third time consistent image using information relating to the an amount of data copied from the first volume to the second volume in a previous copy cycle.

11. The computer system of claim 10, wherein the amount of data corresponds to the data copied to the second volume from the first volume to provide the second volume with the second time consistent image.

12. The computer system of claim 10, wherein the information relating to the amount of data copied from the first volume to the second volume corresponds to a copy time needed to provide the second volume with the second time consistent image.

13. A computer system comprising:
a first storage system;
wherein the first storage system is configured to copy data from a first volume to a second volume to provide the second volume with a first time consistent image with respect to a first given time, the first and second volumes being provided in the first storage system;

wherein the first storage system is configured to transfer the data from the second volume to a third volume to provide the third volume with a second time consistent image with respect to a second given time, the third volume being provided in a second storage system that is located at least 10 miles from the first storage system; and wherein the first storage system is configured to transmit the data stored in the first volume to a back-up volume provided in a third storage system; and wherein transmitting the data stored in the first volume to the back-up volume provided in the third storage system involves a synchronous remote copying method and transferring the data from the second volume to the third volume involves an asynchronous remote copying method.

14. A computer system comprising:

a first storage sub-system;

wherein the first storage sub-system is configured to copy data from a first volume to a second volume to provide the second volume with a first time consistent image with respect to a first given time, the first and second volumes being provided in the first storage sub-system;

wherein the first storage sub-system is configured to transfer the data from the second volume to a third volume to provide the third volume with a second time consistent image with respect to a second given time, the third volume being provided in a second storage sub-system that is located at least 10 miles from the first storage system;

wherein the first storage sub-system is configured to receive the data from a third storage sub-system;

wherein receiving the data from the third storage sub-system involves a synchronous remote copying method and transferring the data from the second volume to the third volume involves an asynchronous remote copying method, and wherein the first given time and the second given time are the same.

15. A computer system comprising:

a first storage system;

wherein the first storage system is configured to copy data from a first volume to a second volume to provide the second volume with a first time consistent image with respect to a first given time, the first and second volumes being provided in the first storage system;

wherein the first storage system is configured to transfer the data from second volume to a third volume to provide the third volume with a second time consistent image with respect to a second given time, the third volume being provided in a second storage system that is located at least 10 miles from the first storage system;

wherein copying the data from the first volume to the second volume includes copying the data from the first volume to a plurality of secondary volumes to provide each of the secondary volumes with the first time consistent image with respect to the first given time, the first and secondary volumes being provided in the first storage system; and wherein transferring the data from the second volume to the third volume includes transferring the data from the secondary volume to a plurality of ternary volumes to provide each of the ternary volumes with the second time consistent image with respect to the second given time, the ternary volumes being provided in a plurality of secondary storage systems that are located at least 10 miles from the first storage system.

16. A storage system comprising a controller which is configured to:

check a first timestamp of a first data to be copied from a first volume to a second volume;

copy the first data to the second volume if the first timestamp is prior to a given reference point;

check a second timestamp of a second data to be copied from the first volume to the second volume;

suspend the copy operation if the second timestamp is after the reference point; and place the second volume in a Freeze mode to indicate that the second volume includes a point in time (PiT) copy of the first volume.

17. The storage system of claim 16, wherein the first and second volumes are defined in the same storage disk array, wherein the first volume receives a write request from a host while data are being copied from the first volume to the second volume.

18. A computer system for providing a point in time remote copy, the computer system comprising:

a primary storage system located at a primary site; and a secondary storage system located at a first remote site from the primary site;

wherein the first storage system is configured to transmit first and second data with first and second timestamps, respectively, from a first volume in the primary storage system to a second volume provided in the secondary storage system, the first and second time stamps being associated with the first and second data, respectively;

wherein the secondary storage system is configured to copy the first data from the second volume to a third volume provided in the secondary storage system using a point in time (PiT) as a reference point of time for the copying;

wherein the secondary storage system is configured to transfer the first data from the third volume in the secondary storage system to a fourth volume in a ternary storage system at a second remote site; and wherein copying the first data from the second volume to the third volume is suspended if the second timestamp of the second data does not satisfy the reference point of time.

19. A computer system for providing a point in time remote copy, the computer system comprising a controller configured to:

check a first timestamp of a first data to be copied from a first volume to each of second and third volumes, the first, second, and third volumes being provided in the same storage system;

copy the first data to the second and third volumes if the first timestamp is prior to a given reference point;

remote copy the first data from the second and third volumes to fourth and fifth volumes, respectively;

transmit the first data from the fourth and fifth volumes to six and seventh volumes, respectively, wherein the fourth and six are provided in a first remote storage system and the fifth and seventh volumes are provided in a second remote storage system;

check a second timestamp of a second data to be copied from the first volume to the second and third volumes; and place the second and third volumes in a Freeze mode to indicate that the second volume includes a point in time (PiT) copy of the first volume if the second timestamp of the second data to be copied from the first volume to the second and third volumes is after the reference point.

20. A computer system comprising:

a primary storage system located at a primary site;

a secondary storage system located at a first remote site from the primary site; and a ternary storage system located at a second remote site from the primary site;

wherein the primary storage system is configured to transmit data from a first volume in the primary storage system to a back-up volume provided in the secondary storage system;

wherein the primary storage system is configured to copy the data from the first volume in the primary storage system to a second volume in the primary storage system using a point in time (PiT) as a reference point of time for the copying, the second volume being provided with a first time consistent image of the first volume with respect to the reference point of time;

wherein the primary storage system is configured to transfer the data from the second volume in the primary storage system to a third volume in the ternary storage system, the third volume being provided with a second time consistent image of the second volume, which is substantially the same as the first time consistent image; and wherein transmitting the data from the first volume in the primary storage system to the back-up volume in the secondary storage system involves a synchronous remote copying method, and transferring the data from the second volume in the primary storage system to the third volume in the ternary storage system involves an asynchronous remote copying method.

21. The computer system of claim 20, wherein the first and second time consistent images are substantially the same.

22. The computer system of claim 20, wherein the primary storage system is configured to receive a plurality of data write requests from a primary host, each of the data write requests having a timestamp and data associated with that write request; and store the data write requests in the primary storage system.

23. The computer system of claim 22, wherein copying the data from the first volume to the second volume includes retrieving a first timestamp associated with first data of the data; and shadow copying the first data from the first volume to the second volume if the first timestamp indicates a time that is prior to the reference point of time.

24. The computer system of claim 23, wherein the primary storage system is configured to retrieve a second timestamp associated with second data of the data; and not copy the second data to the second volume if the second timestamp indicates a time that is subsequent to the reference point of time.

25. The computer system of claim 20, wherein the ternary storage system is configured to copy the data from the third volume in the ternary storage system to a fourth volume in the ternary storage system, the fourth volume being provided with a third time consistent image corresponding to the second time consistent image; and wherein the ternary storage system is configured to estimate time required for providing the fourth volume with the third time consistent image using information relating to the an amount of data copied from the first volume to the second volume in a previous copy cycle.

* * * * *